US012665473B2

(12) United States Patent
Yamada et al.

(10) Patent No.: US 12,665,473 B2
(45) Date of Patent: Jun. 23, 2026

(54) FIXING STRUCTURE FOR NEUTRAL WIRE AND TEMPERATURE SENSOR

(71) Applicant: DENSO CORPORATION, Kariya-city (JP)

(72) Inventors: Junpei Yamada, Kariya-city (JP); Takemasa Yamamoto, Kariya-city (JP); Koichi Terada, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 424 days.

(21) Appl. No.: 18/345,257

(22) Filed: Jun. 30, 2023

(65) Prior Publication Data

US 2024/0014713 A1    Jan. 11, 2024

(30) Foreign Application Priority Data

Jul. 7, 2022    (JP) ................................. 2022-109668
Feb. 15, 2023    (JP) ................................. 2023-021878

(51) Int. Cl.
H02K 11/25    (2016.01)

(52) U.S. Cl.
CPC ................................... H02K 11/25 (2016.01)

(58) Field of Classification Search
CPC ....... H02K 11/25; H02K 2203/09; H02K 3/50
USPC ....................................................... 310/68 C
See application file for complete search history.

(56) References Cited

U.S. PATENT DOCUMENTS

| | | | |
|---|---|---|---|
| 12,294,252 B2 * | 5/2025 | Ito ............................ | G01K 7/22 |
| 2013/0270973 A1 * | 10/2013 | Ikemoto ................. | H02K 11/25 |
| | | | 310/68 C |
| 2020/0266689 A1 * | 8/2020 | Dunn ....................... | H02K 1/16 |

FOREIGN PATENT DOCUMENTS

| | | | |
|---|---|---|---|
| JP | 2016-123155 | * | 7/2016 |
| JP | 2018-061389 A | | 4/2018 |

OTHER PUBLICATIONS

JP-2013219913 (Year: 2013).*
JP-2016129446 (Year: 2016).*
JP-2021175358 (Year: 2021).*
CN-114430210 (Year: 2022).*
JP-2019110676 (Year: 2019).*

* cited by examiner

*Primary Examiner* — Ahmed Elnakib
(74) *Attorney, Agent, or Firm* — Precision Patents, P.C.

(57) ABSTRACT

A fixing structure for fixing a neutral wire and a temperature sensor fixes the neutral wire forming a neutral point of a stator coil and the temperature sensor. The fixing structure has a plurality of protruding portions that protrude from the neutral wire in a direction away from a current path in the neutral wire during energization and are opposed to each other. The temperature sensor is sandwiched between a plurality of protruding portions facing each other.

17 Claims, 6 Drawing Sheets

FIXING STRUCTURE FOR NEUTRAL WIRE AND TEMPERATURE SENSOR

CROSS REFERENCE TO RELATED APPLICATIONS

The present application is based on Japanese Patent Application No. 2022-109668 filed on Jul. 7, 2022 and Japanese Patent Application No. 2023-21878 filed on Feb. 15, 2023, disclosure of which is incorporated herein by reference.

TECHNICAL FIELD

The present disclosure relates to a fixing structure for fixing a neutral wire forming a neutral point of a stator coil and a temperature sensor.

BACKGROUND

Conventionally, in this type of fixing structure, there is a structure in which the neutral wire and the temperature sensor are fixed.

SUMMARY

As for a first means, a fixing structure for fixing a neutral wire forming a neutral point of a stator coil and a temperature sensor includes a plurality of protruding portions protruding from the neutral wire in a direction away from a current path in the neutral wire during energization and facing each other. The temperature sensor is sandwiched between the plurality of protruding portions facing each other.

DETAILED DESCRIPTION

Figure 1:
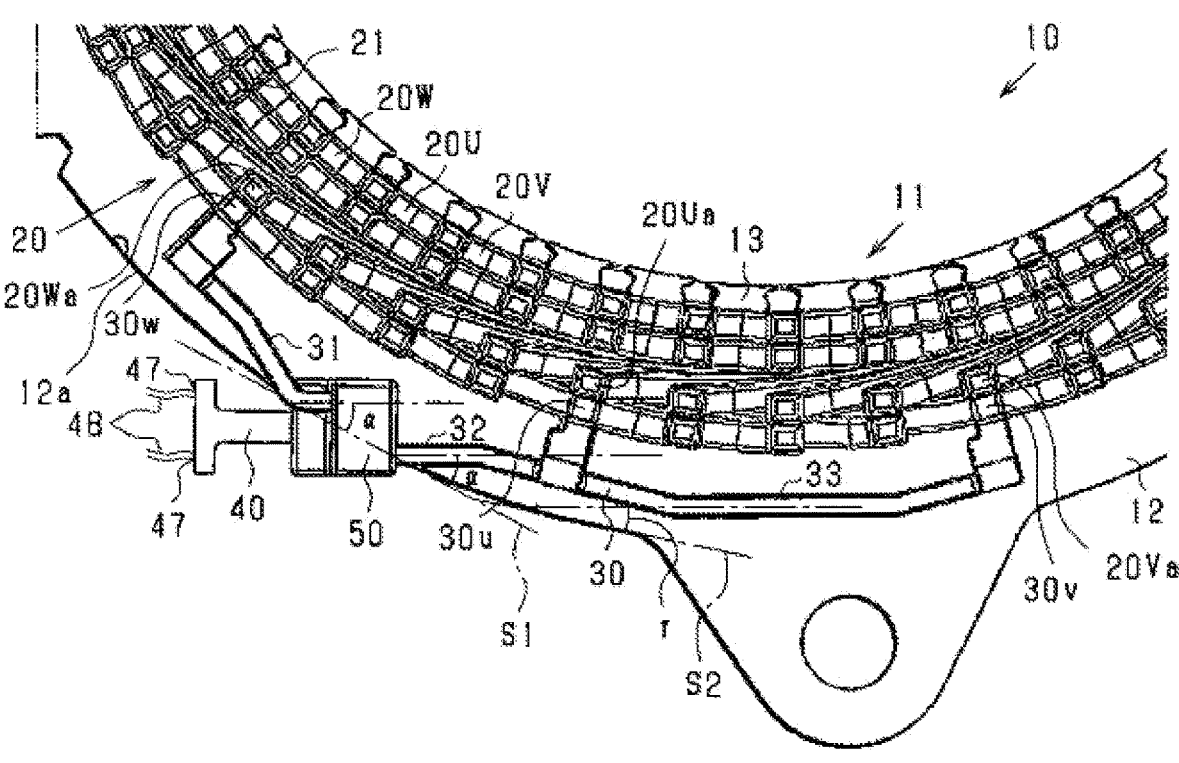
FIG. 1 is a partial plan view of a stator.

In an assumable example, in this type of fixing structure, there is a structure in which the neutral wire and the temperature sensor are fixed by sandwiching the temperature sensor between the U-shaped portion where the neutral wire is bent into a U shape.

By the way, when each terminal of the neutral wire is welded to one end of each phase coil of a stator coil, the neutral wire may be bent or stressed due to an alignment error or the like. As a result, a force with which the neutral wire pinches the temperature sensor may decrease. In addition, due to vibrations during running a vehicle equipped with a stator coil, the position of the temperature sensor may shift due to bending of the neutral wire or force acting on the temperature sensor. In the fixing structure, the temperature sensor is sandwiched and fixed by the U-shaped portion formed by bending the neutral wire into a U-shape. and the temperature sensor are difficult to increase. Therefore, it is difficult to increase the area of the portions sandwiching the temperature sensor, and it is difficult to increase the force for fixing the neutral wire and the temperature sensor.

The present disclosure is to make it easier to increase the area of the portions where the temperature sensor is sandwiched in the fixing structure of the neutral wire and the temperature sensor.

As for a first means, a fixing structure for fixing a neutral wire forming a neutral point of a stator coil and a temperature sensor includes a plurality of protruding portions protruding from the neutral wire in a direction away from a current path in the neutral wire during energization and facing each other. The temperature sensor is sandwiched between the plurality of protruding portions facing each other.

According to the above configuration, the fixing structure of the neutral wire and the temperature sensor fixes the neutral wire forming the neutral point of the stator coil and the temperature sensor. Specifically, a plurality of protruding portions facing each other protrude from the neutral wire. The temperature sensor is sandwiched between the plurality of protruding portions facing each other.

Here, the plurality of protruding portions facing each other protrude from the neutral wire in a direction away from a current path in the neutral wire during energization. Therefore, it is possible to freely form a plurality of protruding portions that sandwich the temperature sensor, apart from the portion of the neutral wire through which the current flows. Therefore, in the fixing structure of the neutral wire and the temperature sensor, it becomes easy to increase the area of the portion sandwiching the temperature sensor. As a result, it becomes easier to increase the force for fixing the neutral wire and the temperature sensor, and it is possible to suppress the displacement of the temperature sensor.

As for a second means, a fixing structure for fixing a neutral wire forming a neutral point of a stator coil and a temperature sensor includes a protruding portion protruding from the neutral wire in a direction away from a current path in the neutral wire during energization and facing a predetermined portion of the neutral wire. The temperature sensor is sandwiched between the predetermined portion of the neutral wire and the protruding portion.

According to the above configuration, the fixing structure of the neutral wire and the temperature sensor fixes the neutral wire forming the neutral point of the stator coil and the temperature sensor. Specifically, the protruding portion facing the predetermined portion of the neutral wire protrudes from the neutral wire. The temperature sensor is sandwiched between the predetermined portion of the neutral wire and the protruding portion.

Here, the protruding portion facing the predetermined portion protrudes from the neutral wire in a direction away from a current path in the neutral wire during energization. Therefore, apart from the portion of the neutral wire through which the current flows, it is possible to freely form the protruding portion facing the predetermined portion of the neutral wire for sandwiching the temperature sensor. Therefore, in the fixing structure of the neutral wire and the temperature sensor, it becomes easy to increase the area of the portion sandwiching the temperature sensor. As a result, it becomes easier to increase the force for fixing the neutral wire and the temperature sensor, and it is possible to suppress the displacement of the temperature sensor.

When the temperature sensor is equipped with a temperature sensing element, if the temperature sensing element is away from the part of the neutral wire flowing the current during energization, the temperature sensing element cannot accurately measure the temperature rise of the neutral wire due to current flow.

In this regard, in a third means, the temperature sensor includes a temperature sensing element, and the temperature sensing element is sandwiched by a portion through which current flows in the neutral wire during energization. According to such a configuration, since the temperature sensing element is sandwiched between the portions of the neutral wire where the temperature rises due to the current flowing, the temperature rise of the neutral wire due to the current flowing can be accurately measured by the temperature sensing element.

In a fourth means, the neutral wire includes a folded portion that is a portion through which current flows in the neutral wire during energization and is bent to fold back. The protruding portion protrudes from the folded portion of the neutral wire, and the temperature sensing element is sandwiched between the folded portion.

According to the above configuration, the neutral wire includes the folded portion which is a portion through which current flows in the neutral wire during energization and which is bent to fold back. Since the folded portion is a portion through which the current flows, and whose temperature rises during energization. The protruding portion protrudes from the folded portion of the neutral wire. Therefore, in a state in which the temperature sensor is sandwiched between a plurality of protruding portions or the predetermined portion of the neutral wire and the protruding portion, the temperature sensing element can be sandwiched between the folded portions whose temperature rises during energization. At this time, the temperature sensing element is sandwiched between the U-shaped parts formed by the folded portion. Compared to the space between the U-shaped part formed by the neutral wire itself, the space for sandwiching the temperature sensors formed by the protruding portions is easily deformed because the protruding portions are free ends. Therefore, it is easier to adjust the distance between the protruding portions than the distance between the U-shaped parts formed by the folded portion. Therefore, in addition to being able to increase the effective area for sandwiching the temperature sensor, there is an advantage that it is easy to secure an effective sandwiching force.

In a fifth means, on the premise of the third or fourth means, the protruding portion is a portion through which current is less likely to flow than the current path in the neutral wire during energization. According to such a configuration, even if the area of the portion where the temperature sensor is sandwiched is increased by the protruding portion, it is difficult for current to flow through the protruding portion. Therefore, it is possible to suppress a decrease in the current density of the portion of the neutral wire where the current flows during the energization. Therefore, it is possible to suppress the deterioration of the temperature responsiveness of the portion of the neutral wire where the temperature sensing element is sandwiched and the current flows, and it is possible to suppress the deterioration of the temperature detection accuracy of the neutral wire by the temperature sensing element.

When the temperature sensing element is sealed with resin, pressure may be applied to the temperature sensing element during molding of the resin, and the temperature sensing element may be damaged.

In this regard, in the sixth means, the temperature sensing element is sealed with a resin on the premise that the temperature sensor is sandwiched between the plurality of protruding portions facing each other, or the temperature sensor is sandwiched between a predetermined portion of the neutral wire and the protruding portion. For this reason, the area of the portion where the temperature sensor is sandwiched can be increased by the protruding portion. The force acting on the temperature sensing element during molding of the resin can be dispersed by the protruding portion, and it is possible to reduce the pressure acting on the temperature sensing element. Therefore, it is possible to suppress damage to the temperature sensing element during molding of the resin.

Generally, the neutral wire is welded to the stator coil. When the temperature sensor is fixed to the neutral wire, the weight of the temperature sensor acts as a load on a welded portion through the neutral wire. If the load acting on the welded portion is large, or if the load repeatedly acting on the welded portion due to vibration becomes large due to the weight of the temperature sensor, the welded portion may be damaged.

In this regard, in a seventh means and an eighth means, the neutral wire includes a plurality of welded portions welded to the plurality of phase coils of the stator coil, respectively, and the temperature sensor is arranged between two adjacent welded portions. According to such a configuration, the temperature sensor can be supported by two welded portions compared to the case where the temperature sensor is fixed in the immediate vicinity of one welded portion. Therefore, the load acting on each welded portion can be reduced, and damage to the welded portion can be suppressed.

In a ninth means, the temperature sensor is arranged in the middle of the two adjacent welded portions. According to such a configuration, the loads acting on the two adjacent welded portions can be evenly approximated, and the maximum value of the load acting on the two adjacent welded portions can be reduced. Therefore, damage to the welded portion can be further suppressed.

In a configuration in which the neutral wire and the temperature sensor are arranged on the outer diameter side of the annular stator core with respect to the stator coil, and are arranged with respect to the stator core in the axial direction of the stator core, and lead wires are drawn from the temperature sensor, the following problems arise. That is, there is a risk that the lead wires will be shaken and hit the outer peripheral edge (corner) of the ends of the stator core in the axial direction due to vibrations caused by the driving of the rotating electric machine that includes the stator coil and the stator core. In that case, the lead wire may break due to repeated contact with the corner of the stator core.

In this regard, in a tenth means, a stator coil is integrated with an annular stator core, the neutral wire and the temperature sensor are arranged on the outer diameter side of the stator core with respect to the stator coil and arranged in the axial direction of the stator core with respect to the stator core, and the neutral wire includes a pair of inclined portions having an angle larger than a predetermined angle with respect to a tangent line of the outer peripheral surface of the stator core when viewed from the axial direction, and a non-inclined portion having an angle smaller than the predetermined angle. The temperature sensor has a drawn portion from which the lead wire is drawn, and is configured to be sandwiched between the pair of inclined portions such that the drawn portion faces an outside of the stator core in a direction along the inclined portions.

In an eleventh means, in a fixing structure for fixing a neutral wire forming a neutral point of a stator coil and a temperature sensor, a stator coil is integrated with an annular stator core, and the neutral wire and the temperature sensor are arranged on the outer diameter side of the stator core with respect to the stator coil and arranged in the axial direction of the stator core with respect to the stator core. The neutral wire includes a pair of inclined portions having an angle larger than a predetermined angle with respect to a tangent line of the outer peripheral surface of the stator core when viewed from the axial direction, and a non-inclined portion having an angle smaller than the predetermined angle. The temperature sensor has a drawn portion from which the lead wire is drawn, and is configured to be sandwiched between the pair of inclined portions such that the drawn portion faces an outside of the stator core in a direction along the inclined portions.

According to the above configuration, since the neutral wire includes a pair of inclined portions having an angle larger than the predetermined angle with respect to the tangent line of the outer peripheral surface of the stator core when viewed from the axial direction, the neutral wire can incline a pair of inclined portions in the radial direction of the stator core with respect to a tangent to the outer peripheral surface of the stator core.

The temperature sensor is configured to be sandwiched between the pair of inclined portions such that the drawn portion of the lead wire faces an outside of the stator core in the direction along the inclined portions. Therefore, the drawn portion of the temperature sensor can be directed toward the outer diameter side of the tangent line of the outer peripheral surface with respect to the stator core, and the lead wire drawn from the drawn portion can be prevented from hitting the corner of the stator core. Therefore, it is possible to prevent wire breakage due to repeated contact with the corner of the stator core due to the vibration of the lead wire. Furthermore, since the temperature sensor is sandwiched between the pair of inclined portions with the drawn portion facing the direction along the inclined portions, it is possible to accurately measure the temperature rise of the neutral wire.

In a twelfth means, the drawn portion is arranged on the outer diameter side of the stator core with respect to the outer peripheral surface of the stator core. According to such a configuration, the drawn portion of the temperature sensor is directed to the outer diameter side of the stator core from the tangent line of the outer peripheral surface, and the position of the drawn portion is set to the outer diameter side of the stator core with respect to the outer peripheral surface of the stator core. Therefore, it is possible to further prevent the lead wires drawn out from the drawn portion from coming into contact with the corner of the stator core.

Moreover, when the temperature sensor is viewed from the axial direction of the stator core, it is possible to prevent the stator core from being present behind the temperature sensor. For this reason, for example, when the temperature sensor is imaged from the axial direction of the stator core for appearance inspection, reflection of light from the stator core can be suppressed. Therefore, it becomes easier to clearly photograph the temperature sensor, and the efficiency and accuracy of the appearance inspection can be improved.

Hereinafter, an embodiment in which the present disclosure is embodied by a motor generator mounted on a hybrid vehicle or an electric vehicle will be described below with reference to the drawings.

As shown in FIG. 1, a stator 10 of a motor generator (rotating electric machine) includes an annular stator core 11 and a stator coil 20 wound around the stator core 11. That is, stator coil 20 is integrated with stator core 11. The stator core 11 includes an annular yoke 12 and a plurality of teeth 13 provided on an inner peripheral surface of the yoke 12 at regular intervals in a circumferential direction. A slot is formed between the adjacent teeth 13, and a conductor 21 is inserted into the slot. The conductor 21 is, for example, a rectangular conductor having a rectangular cross section, and is bent into a predetermined shape and inserted into the slot. A plurality of conductors 21 are welded together to form a coil wound around teeth 13.

The stator coil 20 is configured by, for example, concentrated winding of the conductor 21. The surfaces of the conductors 21 are enameled to ensure insulation between adjacent conductors 21. The stator coil 20 has a W-phase coil 20W, a U-phase coil 20U, and a V-phase coil 20V. Each phase coil 20W, 20U, and 20V is composed of a plurality of single coils. A single coil is formed by winding the conductor 21 around one tooth 13. Each single coil is arranged on each tooth 13 so as to be repeatedly arranged in the circumferential direction. The stator coil 20 can also be configured by winding the conductor 21 in a distributed manner.

Each input terminal (not shown) is connected to each first end (one end) (not shown) of each phase coil 20W, 20U, 20V constructed by connecting multiple single coils of the same phase. Each input terminal is connected to an inverter (not shown) that outputs three-phase AC power. Each second end 20Wa, 20Ua, 20Va (other end) of each phase coil 20W, 20U, 20V is connected to a neutral wire 30. Each phase coil 20W, 20U, and 20V is connected in parallel between each input terminal and the neutral wire 30, and for example, is 2Y-connected (parallel star connection). The neutral wire 30 constitutes a neutral point of stator coil 20.

Figure 2:
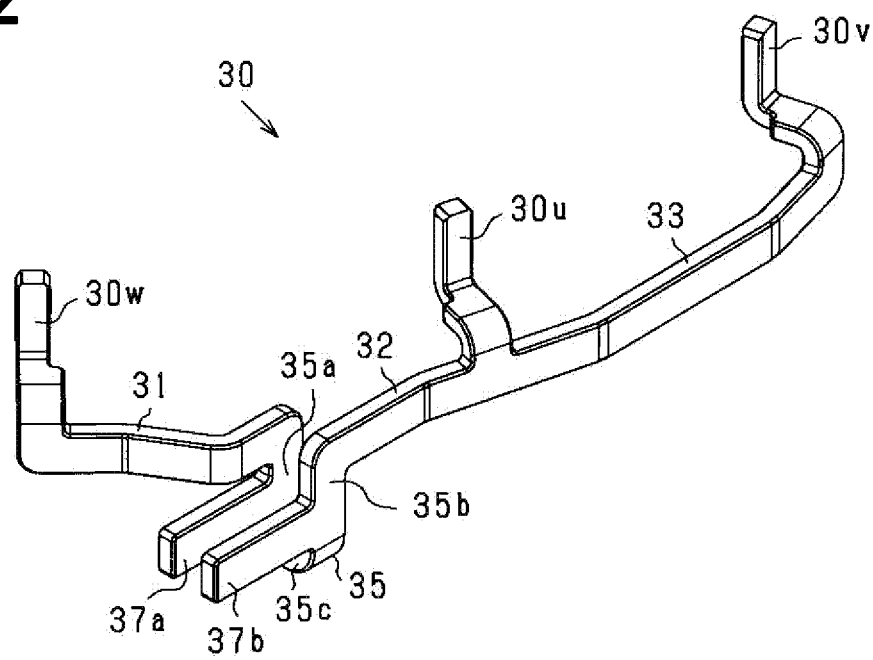
FIG. 2 is a perspective view of a neutral wire and a protruding portion.

Each second end 20Wa, 20Ua, 20Va of each phase coil 20W, 20U, 20V is connected by welding to the neutral wire 30 shown in FIG. 2. The neutral wire 30 is formed by bending one flat wire to form respective terminals 30w, 30u and 30v. Each phase coil 20W, 20U, 20V is welded to each terminal 30w, 30u, 30v (welded portion). A U-shaped portion 35 bent into a U-shape is formed at a center (middle) of the neutral wire 30 between the adjacent terminal 30w (welded portion) and terminal 30u (welded portion). In the neutral wire 30, a portion closer to the terminal 30w than the U-shaped portion 35 is a first portion 31, a portion between the U-shaped portion 35 and the terminal 30u is a second portion 32, and a portion between the terminal 30u and the terminal 30v is a third portion 33. The first portion 31, the second portion 32, and the third portion 33 extend (are arranged) along the same (common) plane. In other words, the centerlines of the first portion 31, the second portion 32, and the third portion 33 are included in the same (common) plane. In addition, the U-shaped portion 35 corresponds to a folded portion that is bent so as to fold back in the neutral wire 30. As shown in FIG. 1, the neutral wire 30 and the temperature sensor 40 are arranged on an outer diameter side of the annular stator core 11 with respect to the stator coil 20 and arranged in the axial direction of the stator core 11 with respect to the stator core 11. Specifically, when viewed from the axial direction of the stator core 11, a part of the neutral wire 30 and the temperature sensor 40 are arranged at positions overlapping the yoke 12 (the outer peripheral edge of the stator core 11).

The temperature sensor 40 has a drawn portion 47 from which a lead wire 48 is drawn. Therefore, there is a possibility that the lead wire 48 may be shaken by vibration caused by driving the motor generator and hit the outer peripheral edge portion (corner of the yoke 12) of the end portion of the stator core 11 in the axial direction. In this case, the lead wire 48 may be broken due to repeated contact with the corner of the yoke 12 (stator core 11). Therefore, the fixing structure of the neutral wire 30 and the temperature sensor 40 has the following configuration.

Figure 3:
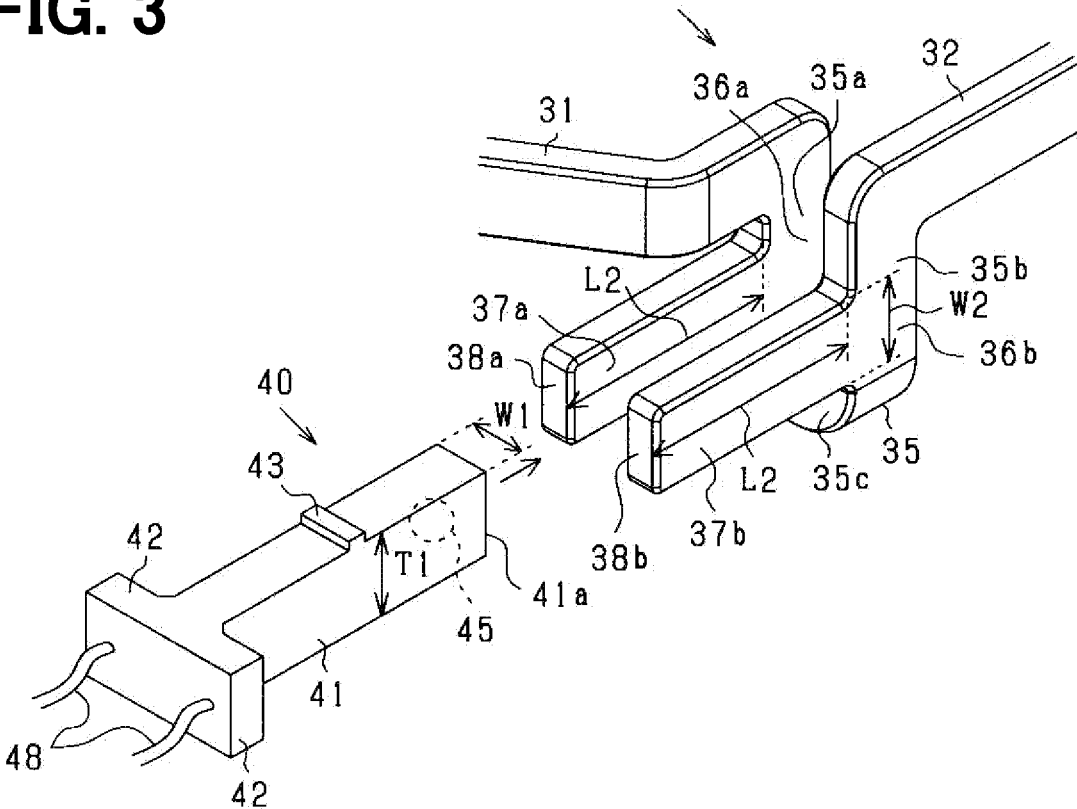
FIG. 3 is an exploded perspective view of the neutral wire, the protruding portion, and a temperature sensor.

FIG. 3 shows an enlarged view around the U-shaped portion 35. A portion of the first portion 31 near the U-shaped portion 35 and a portion of the second portion 32 near the U-shaped portion 35 are parallel (substantially parallel). A leg part 35a and a leg part 35b (straight line parts) of the U-shaped portion 35 extend in the same direction. Specifically, the leg parts 35a and 35b extend in a direction (downward direction in FIG. 3) perpendicular to a plane including the center lines of the first portion 31 and the second portion 32. The leg parts 35a and 35b are connected by a bottom part 35c (curved part) of the U-shaped portion 35.

Figure 4:
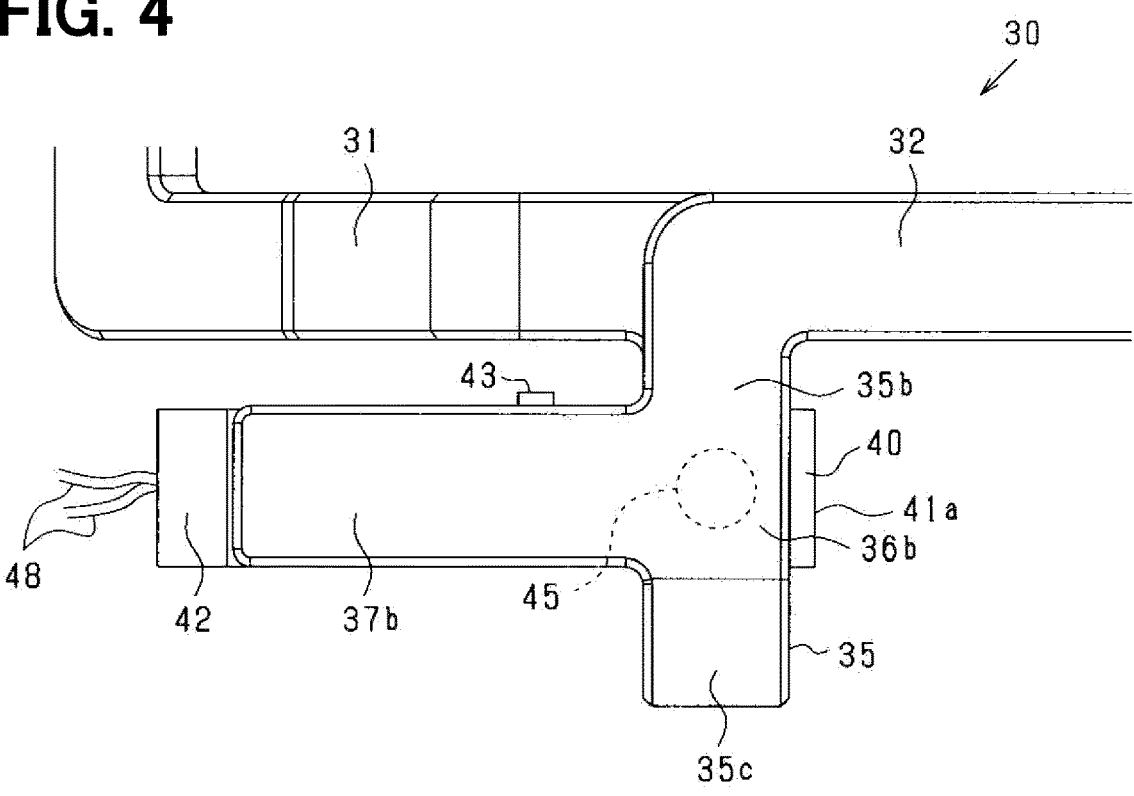
FIG. 4 is a side view of the neutral wire, the protruding portion, and the temperature sensor.

A protruding portion 37a and a protruding portion 37b protrude from the leg parts 35a and 35b, respectively. The protruding portion (inclined portion) 37a protrudes from the leg part 35a in parallel (substantially parallel) to a portion of the first portion 31 near the U-shaped portion 35 and a portion of the second portion 32 near the U-shaped portion 35. The protruding portion (inclined portion) 37b protrudes from the leg part 35b (the U-shaped portion 35) in parallel (substantially parallel) to a portion of the first portion 31 near the U-shaped portion 35 and a portion of the second portion 32 near the U-shaped portion 35. The protruding portions 37a and 37b are formed in flat plates (flat plates), are opposed to each other, and are parallel (substantially parallel) to each other. As shown in FIG. 1, when viewed from the axial direction of the stator core 11, the angle α formed by a portion of the first portion 31 in the vicinity of the U-shaped portion 35 and the protruding portion 37a with respect to a tangent line S1 of the outer peripheral surface 12a of the stator core 11 is larger than the predetermined angle β. The predetermined angle β is, for example, 20° to 25°, and the angle α is, for example, 30°. That is, the portion of the first portion 31 in the vicinity of the U-shaped portion 35 and the protruding portion 37a are inclined in the radial direction of the stator core 11 with respect to the tangent line S1. When viewed from the axial direction of the stator core 11, a portion of the second portion 32 in the vicinity of the U-shaped portion 35 and the protruding portion 37b also form an angle α with respect to the tangent line S1 of the outer peripheral surface 12a of the stator core 11. Therefore, the portion of the second portion 32 in vicinity of the U-shaped portion 35 and the protruding portion 37b are also inclined in the radial direction of the stator core 11 with respect to the tangent line S1. Then, as shown in FIG. 4, a temperature sensor 40 is sandwiched between the protruding portion 37a (not visible in FIG. 4) and the protruding portion 37b. On the other hand, when viewed from the axial direction of the stator core 11, an angle α formed by the third portion 33 (non-inclined portion) with respect to the tangent line S2 of the outer peripheral surface 12a of the stator core 11 is smaller than the predetermined angle R. The angle α is, for example, 10°. The temperature sensor 40 is sandwiched between the protruding portions 37a and 37b (a pair of inclined portions) so that the drawn portion 47 faces outward with respect to the stator core 11 in the direction along the protruding portions 37a and 37b. When viewed from the axial direction of the stator core 11, the tangent line of the outer peripheral surface 12a of the stator core 11 to the target portion of the neutral wire 30 is drawn at an intersection of the target portion or the extension line of the target portion and the outer peripheral surface 12a.

The drawn portion 47 is arranged on the outer diameter side of the stator core 11 with respect to the outer peripheral surface 12 a of the stator core 11. That is, when viewed from the axial direction of the stator core 11, the drawn portion 47 does not overlap the yoke 12 (the outer peripheral portion of the stator core 11).

The temperature sensor 40 includes a main body 41, an overhang 42, a ridge 43 and a thermistor element 45. The main body 41, the overhang 42, and the ridge 43 are made of resin or the like. The main body 41 is formed in a cuboid (rectangular parallelepiped shape). The overhangs 42 protrude from one longitudinal end of the main body 41 to both sides. The ridge 43 extending in a direction perpendicular (substantially perpendicular) to a longitudinal direction of the main body 41 is provided on an upper surface (one surface) of the main body 41. The thermistor element 45 (temperature sensing element) is embedded in an end portion 41a (one end portion in the longitudinal direction) of the main body 41 opposite to the overhangs 42. The thermistor element 45 changes its resistance value according to the temperature. The thermistor element 45 is connected to a lead wire 48.

A distance between the protruding portions 37a and 37b is equal (substantially equal) to a width W1 of the main body 41 of the temperature sensor 40, or slightly narrower than the width W1. A length L2 of the protruding portions 37a and 37b is set so that the end portion 41a of the main body 41 on the side opposite to the overhang 42 protrudes slightly from the U-shaped portion 35 or is accommodated in the U-shaped portion 35 in a state where the ends 38a and 38b of the protruding portions 37a and 37b on the opposite side of the U-shaped portion 35 are in contact with the overhang 42 of the main body 41 of the temperature sensor 40. A width W2 of the protruding portions 37a and 37b is equal (substantially equal) to a height T1 of the main body 41 of the temperature sensor 40. In a state where the ends 38a and 38b of the protruding portions 37a and 37b are in contact with the overhang 42 of the main body 41 of the temperature sensor 40, the thermistor element 45 is positioned between the leg parts 35a and 35b of the U-shaped portion 35. That is, the thermistor element 45 is sandwiched between the leg parts 35a and 35b of the U-shaped portion 35 and U-shaped portion 35. At this time, since the ends 38a, 38b of the protruding portions 37a, 37b are in contact with the overhang 42 of the main body 41 of the temperature sensor 40, the positions of the protruding portions 37a and 37b and the temperature sensor 40, more specifically, the positions of the leg parts 35a and 35b of the U-shaped portion 35 and the thermistor element 45 can be aligned. Specifically, the temperature sensor 40 is sandwiched between a connecting portion 36a between the protruding portion 37a and the leg part 35a and a connecting portion 36b between the protruding portion 37b and the leg part 35b. The temperature sensor 40 is arranged in the center between the adjacent terminals 30w and 30u.

When current flows between the terminals 30w and 30u of the neutral wire when the stator coil 20 is energized, current flows through the first portion 31, the U-shaped portion 35, and the second portion 32. That is, the first portion 31, the U-shaped portion 35, and the second portion 32 form a current path in the neutral wire during energization. On the other hand, when current flows between the terminal and the terminal 30*u* of the neutral wire 30, the current does not flow through the protruding portions 37*a* and 37*b* (current is less likely to flow in comparison with the first portion 31, U-shaped portion 35, and second portion 32). That is, the protruding portions 37*a* and 37*b* do not form a current path in the neutral wire 30 during energization (they are deviated from the current path), and protrude from the U-shaped portion 35 (neutral wire 30) in a direction away from the current path in the neutral wire during energization.

As shown in FIG. 1, the thermistor element 45 (the temperature sensor 40) is sealed with the resin 50 in a state where the temperature sensor 40 is sandwiched between the protruding portion 37*a* and the connecting portion 36*a* and the protruding portion 37*b* and the connecting portion 36*b*. When the thermistor element 45 is sealed with the resin 50, the thermistor element 45 may be damaged due to pressure acting on the thermistor element 45 when the resin 50 is molded. In this respect, the protruding portions 37*a* and 37*b* can increase the area of the portion where the temperature sensor 40 is sandwiched, and the force acting on the thermistor element during molding of the resin 50 can be dispersed by the protruding portions 37*a* and 37*b*. Then, the pressure acting on the thermistor element 45 can be reduced. Therefore, it is possible to suppress damage to the thermistor element 45 during molding of the resin 50.

In the fixing structure of the neutral wire 30 and the temperature sensor 40 described above, the stator 10 or the temperature sensor 40 vibrates when the vehicle equipped with the motor generator is running. Here, since the main body 41 of the temperature sensor 40 is provided with the ridges 43, the ridges 43 bite into the resin after the temperature sensor 40 is sealed with the resin 50 and serve as an anchor. As a result, it is possible to prevent the position of the temperature sensor 40 from shifting in a longitudinal direction of the protruding portions 37*a* and 37*b* due to vibration during running of the vehicle. Specifically, it is possible to prevent the thermistor element 45 from being displaced from between the leg parts 35*a* and 35*b* of the U-shaped portion 35.

Next, the process when the stator coil 20 is energized will be described. As described above, when current flows between the terminals 30*w* and 30*u* of the neutral wire 30 when the stator coil 20 is energized, the current flows through the first portion 31, the U-shaped portion 35, and the second portion 32. At this time, no current flows through the protruding portions 37*a* and 37*b*, so the current density at the connecting portion 36*a* between the protruding portion 37*a* and the leg part 35*a* and the connecting portion 36*b* between the protruding portion 37*b* and the leg part 35*b* does not decrease. Therefore, the temperature of the connecting portions 36*a* and 36*b* rises quickly during energization, and the temperature detection accuracy of the connecting portions 36*a* and 36*b* by the thermistor element 45 is improved. Further, since the temperature sensor 40 is sandwiched between the protruding portions 37*a* and 37*b*, the temperature of the temperature sensor 40 is prevented from being lowered by ATF (Automatic Transmission Fluid) for cooling the coil.

The present embodiment described above in detail has the following advantages.

The plurality of protruding portions 37*a* and 37*b* facing each other protrude from the neutral wire 30 in a direction away from a current path (the first portion 31, the U-shaped portion 35, the second portion 32) in the neutral wire 30 during energization. Therefore, it is possible to freely form a plurality of protruding portions 37*a* and 37*b* that sandwich the temperature sensor 40, apart from the portion of the neutral wire 30 through which the current flows. Therefore, in the fixing structure of the neutral wire 30 and the temperature sensor 40, it becomes easy to increase the area of the portion sandwiching the temperature sensor 40. As a result, it becomes easier to increase the force for fixing the neutral wire 30 and the temperature sensor 40, and it is possible to suppress the displacement of the temperature sensor 40.

When the temperature sensor 40 is equipped with the thermistor element if the thermistor element 45 is away from the part of the neutral wire 30 flowing the current during energization, the thermistor element 45 cannot accurately measure the temperature rise of the neutral wire 30 due to current flow. In this regard, the temperature sensor 40 has the thermistor element 45, and the thermistor element 45 is sandwiched between portions (leg parts 35*a* and 35*b*) through which current flows in the neutral wire 30 during energization. According to such a configuration, since the thermistor element 45 is sandwiched between the portions of the neutral wire 30 where the temperature rises due to the current flow, the temperature rise of the neutral wire due to the current flow can be accurately measured by the thermistor element 45.

The neutral wire 30 includes the U-shaped portion 35 which is a portion through which current flows in the neutral wire 30 during energization and which is bent to fold back. Since the U-shaped portion 35 is a portion through which the current flows, and whose temperature rises during energization. The protruding portions 37*a* and 37*b* protrude from the U-shaped portion 35 of the neutral wire 30. Therefore, in a state in which the temperature sensor 40 is sandwiched between a plurality of protruding portions 37*a* and 37*b*, the thermistor element 45 can be sandwiched between the U-shaped portion 35 whose temperature rises during energization.

The protruding portions 37*a* and 37*b* are portions through which current does not flow during energization. According to such a configuration, even if the area of the portion where the temperature sensor 40 is sandwiched is increased by the protruding portion 37*a* and 37*b*, it is difficult for current to flow through the protruding portion 37*a* and 37*b*. Therefore, it is possible to suppress a decrease in the current density of the portions (the connecting portions 36*a* and 36*b*) of the neutral wire 30 where the current flows during energization. Therefore, it is possible to suppress the deterioration of the temperature responsiveness of the portion of the neutral wire 30 where the thermistor element 45 is sandwiched and the current flows, and it is possible to suppress the deterioration of the temperature detection accuracy of the neutral wire 30 by the thermistor element 45.

When the temperature sensor 40 is fixed to the neutral wire 30, the weight of the temperature sensor 40 acts as a load on the terminals via the neutral wire 30. If the load acting on the terminals is large, or if the load repeatedly acting on the terminals due to vibration becomes large by the weight of the temperature sensor 40, the terminals may be damaged. In this regard, the neutral wire 30 has a plurality of terminals 30*w*, 30*u*, 30*v* welded to the plurality of phase coils 20W, 20U, 20V of the stator coil 20, respectively, and the temperature sensor 40 is arranged between two adjacent terminals 30*w* and 30*u*. According to such a configuration, the temperature sensor 40 can be supported by the two terminals 30*w* and 30*u* compared to the case where the temperature sensor 40 is fixed in the immediate vicinity of one terminal. Therefore, the load acting on the terminals 30*w* and 30*u* can be reduced, and damage to the terminals 30*w* and 30*u* can be suppressed.

The temperature sensor 40 is arranged in the center between two adjacent terminals 30*w* and 30*u*. According to such a configuration, the loads acting on the two adjacent terminals 30*w* and 30*u* can be evenly approximated, and the maximum value of the load acting on the two adjacent terminals 30*w* and 30*u* can be reduced. Therefore, it is possible to further suppress damage to the terminals 30*w* and 30*u*.

In the fixing structure of the neutral wire 30 and the temperature sensor 40, the area of the portion sandwiching the temperature sensor 40 can be easily increased, so a thickness of the neutral wire 30 can be reduced. In that case, the neutral wire 30 is likely to be deformed, and the alignment errors when welding each of the terminals 30*u*, and 30*v* of the neutral wire 30 to one end of each of the phase coils 20W, and 20V of the stator coil 20 can be easily absorbed by the deformation of the neutral wire 30.

When viewed from the axial direction of the stator core 11, the neutral wire includes a pair of protruding portions 37*a* and 37*b* whose angle α with respect to the tangent line S1 of the outer peripheral surface 12*a* of the stator core 11 is larger than the predetermined angle β. Therefore, the pair of protruding portions 37*a* and 37*b* can be inclined in the radial direction of the stator core 11 with respect to the tangent line S1 of the outer peripheral surface 12*a* of the stator core 11. The temperature sensor 40 is sandwiched between the pair of protruding portions 37*a* and 37*b* so that the drawn portion 47 of the lead wire 48 faces outward with respect to the stator core 11 in the direction along the protruding portions 37*a* and 37*b*. Therefore, the drawn portion 47 of the temperature sensor 40 can be directed toward the outer diameter side of the tangent line S1 of the outer peripheral surface 12*a* with respect to the stator core 11, and the lead wire 48 drawn from the drawn portion 47 can be prevented from hitting the corner of the stator core 11. Therefore, it is possible to prevent wire breakage due to repeated contact with the corner of the stator core 11 due to the vibration of the lead wire 48. Furthermore, since the temperature sensor 40 is sandwiched between the pair of protruding portions 37*a* and 37*b* with the drawn portion 47 facing in the direction along the protruding portions 37*a* and 37*b*, the temperature rise of the neutral wire 30 can be accurately measured.

Since the drawn portion 47 of the temperature sensor 40 can be directed to the outer diameter side of the tangent line S1 of the outer peripheral surface 12*a* with respect to the stator core 11, there is no need to forcibly bend the lead wire 48 in order to guide the lead wire 48 in the radial direction of the stator core 11. Therefore, routing of the lead wire 48 is facilitated.

The drawn portion 47 is arranged on the outer diameter side of the stator core 11 with respect to the outer peripheral surface 12*a* of the stator core 11. According to such a configuration, the drawn portion 47 of the temperature sensor 40 is directed to the outer diameter side of the stator core 11 from the tangent line S1 of the outer peripheral surface 12*a*, and the position of the drawn portion 47 is set to the outer diameter side of the stator core 11 with respect to the outer peripheral surface 12*a* of the stator core 11. Therefore, it is possible to further prevent the lead wire 48 drawn out from the drawn portion 47 from coming into contact with the corner of the stator core 11. Moreover, when the temperature sensor 40 is viewed from the axial direction of the stator core 11, it is possible to prevent the stator core

11 from being present behind the temperature sensor 40. For this reason, when the temperature sensor 40 is imaged from the axial direction of the stator core 11 for an appearance inspection, reflection of light from the stator core 11 can be suppressed. Therefore, it becomes easier to clearly photograph the temperature sensor 40, and the efficiency and accuracy of the appearance inspection can be improved.

The above-described embodiment can be modified as follows in practical application. Elements identical to the elements of the above embodiment are designated by the same reference signs as the above embodiment, and redundant description thereof is omitted.

The temperature sensor 40 is not limited to being arranged in the center of the two adjacent terminals 30*w* and 30*u*, and may be placed closer to one of the two terminals 30*w* and 30*u* as long as the temperature sensor 40 is arranged therebetween.

The width W2 of the protruding portions 37*a* and 37*b* may be wider than the height T1 of the main body 41 of the temperature sensor 40.

Figure 5:
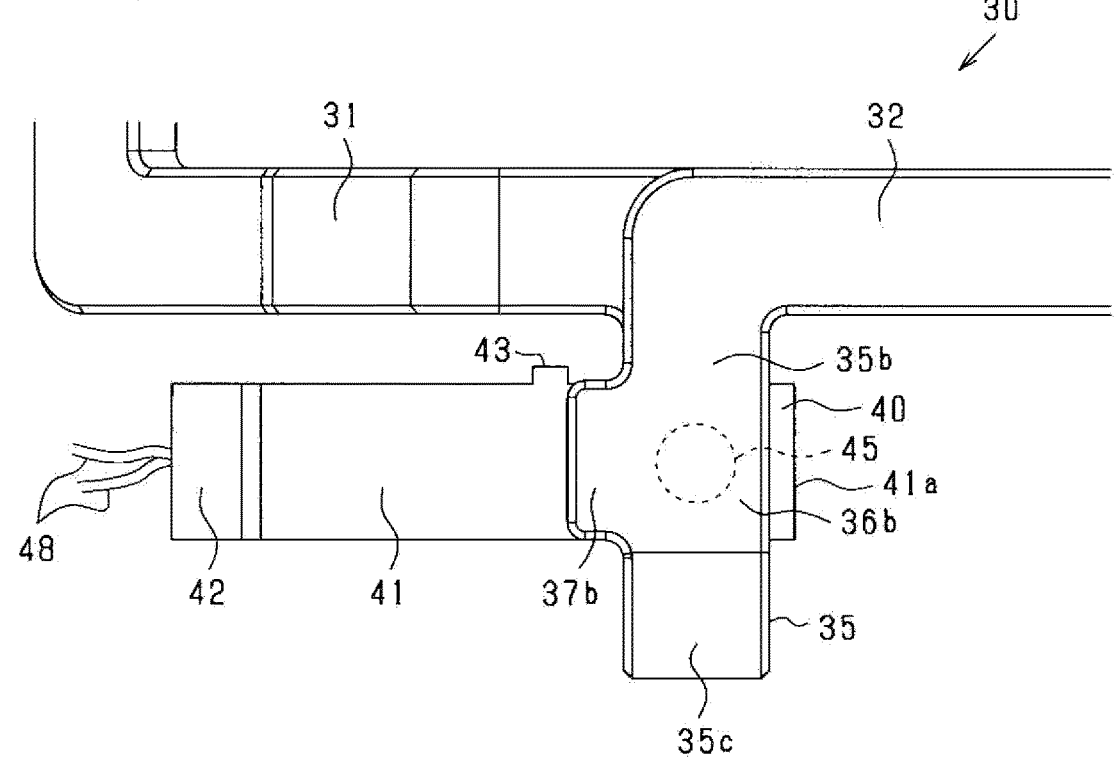
FIG. 5 is a side view showing a modification of the protruding portion.

As shown in FIG. 5, the protruding portions 37*a* and 37*b* (the protruding portion 37*a* is not visible) are formed shorter than the protruding portions 37*a* and 37*b* of the above embodiment, and an embodiment in which the protruding portions 37*a* and 37*b* do not abut on the overhang 42 of the main body 41 of the temperature sensor can also be adopted. With such an embodiment as well, the area of the portion sandwiching the temperature sensor 40 can be increased by the protruding portions 37*a* and 37*b*, and the force for fixing the neutral wire 30 and the temperature sensor can be increased. In this case as well, when viewed from the axial direction of the stator core 11, the angle α formed by the protruding portions 37*a* and 37*b* (pair of inclined portions) with respect to the tangent line S1 of the outer peripheral surface 12*a* of the stator core 11 is larger than the predetermined angle β. Therefore, the drawn portion 47 of the temperature sensor 40 can be directed toward the outer diameter side of the tangent line S1 of the outer peripheral surface 12*a* with respect to the stator core 11, and the lead wire 48 drawn from the drawn portion 47 can be prevented from hitting the corner of the stator core 11. Also, the protruding portions 37*a* and 37*b* are omitted, and other embodiment in which the temperature sensor 40 is sandwiched between the leg parts 35*a* and 35*b* of the U-shaped portion (the folded portion) 35, and the temperature sensor 40 is arranged between the two adjacent terminals 30*w* and 30*u* can also be adopted. According to such other embodiment, the temperature sensor 40 can be supported by the two terminals 30*w* and 30*u* compared to the case where the temperature sensor 40 is fixed in the immediate vicinity of one terminal. In this case as well, when viewed from the axial direction of the stator core 11, the angle α formed by the leg parts 35*a* and 35*b* (pair of inclined portions) with respect to the tangent line S1 of the outer peripheral surface 12*a* of the stator core 11 is larger than the predetermined angle R. Therefore, the drawn portion 47 of the temperature sensor 40 can be directed toward the outer diameter side of the tangent line S1 of the outer peripheral surface 12*a* with respect to the stator core 11, and the lead wire 48 drawn from the drawn portion 47 can be prevented from hitting the corner of the stator core 11.

A configuration in which the thermistor element 45 is arranged between the protruding portion 37*a* and the protruding portion 37*b* can also be adopted.

Apart from the configuration in which the temperature sensor 40 is sandwiched between one protruding portion 37*a* and one protruding portion 37*b*, other embodiment in which the temperature sensor 40 is sandwiched between one protruding portion and a plurality of protruding portions, or other embodiment in which the temperature sensor 40 is sandwiched between a plurality of protruding portions and a plurality of protruding portions can also be adopted.

Figure 6:
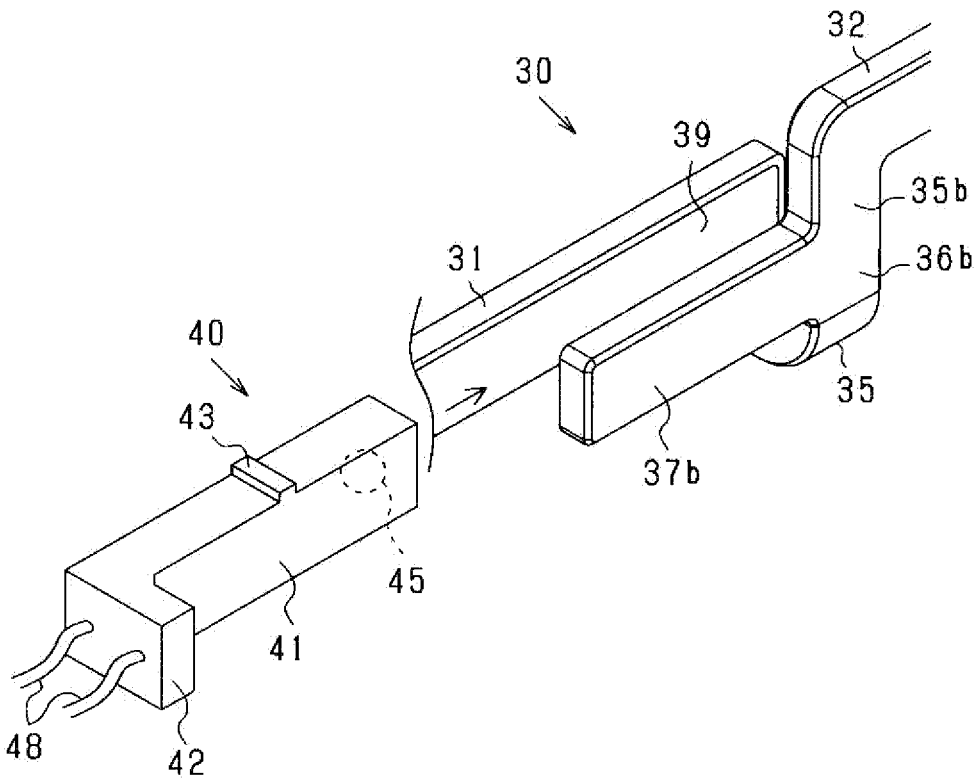
FIG. 6 is an exploded perspective view showing another modification of the neutral wire, the protruding portion, and the temperature sensor.
Figure 7:
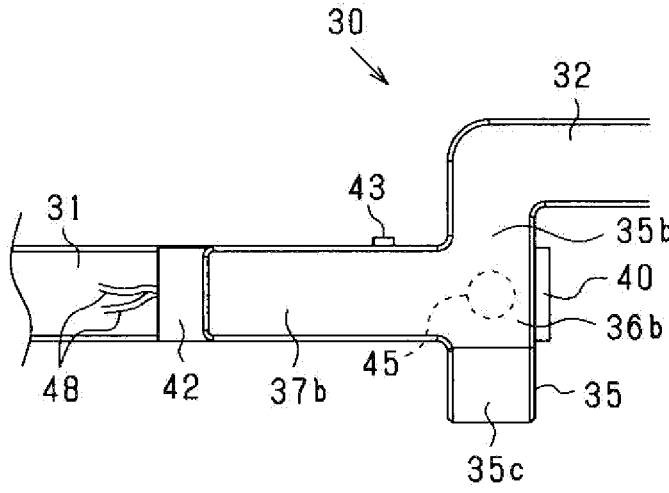
FIG. 7 is a side view of the neutral wire, the protruding portion, and the temperature sensor.

As shown in FIGS. 6 and 7, the fixing structure includes a protruding portion 37*b* which protrudes from the U-shaped portion 35 (neutral wire 30) in a direction away from the current path in the neutral wire 30 during energization, and faces a predetermined portion 39 of the neutral wire 30. The temperature sensor 40 may be sandwiched between the predetermined portion 39 of the neutral wire 30 and the protruding portion 37*b*. The predetermined portion 39 of the neutral wire 30 and the protruding portion 37*b* are provided to face each other and in parallel. The thermistor element 45 is sandwiched between a connecting portion 36*b* connecting the leg part of the U-shaped portion 35 (folded portion) to the protruding portion 37*b* and a predetermined portion 39 of the neutral wire 30. The other configurations are the same as those of the above embodiment.

According to the above embodiment, the protruding portion 37*b* facing the predetermined portion 39 of the neutral wire 30 protrudes from the neutral wire 30 in the direction away from the current path (the first portion 31, the U-shaped portion 35, the second portion 32) in the neutral wire 30 during energization. Therefore, apart from the portion of the neutral wire 30 through which the current flows, it is possible to freely form the protruding portion 37*b* facing the predetermined portion 39 of the neutral wire for sandwiching the temperature sensor 40. Therefore, in the fixing structure of the neutral wire 30 and the temperature sensor 40, it becomes easy to increase the area of the portion sandwiching the temperature sensor 40. As a result, it becomes easier to increase the force for fixing the neutral wire 30 and the temperature sensor 40, and it is possible to suppress the displacement of the temperature sensor 40. In this case, when viewed from the axial direction of the stator core 11, the angle α formed by the predetermined portion 39 and the protruding portion 37*b* (a pair of inclined portions) of the neutral wire 30 with respect to the tangent line S1 of the outer peripheral surface 12*a* of the stator core 11 is larger than the predetermined angle R. Therefore, the drawn portion 47 of the temperature sensor 40 can be directed toward the outer diameter side of the tangent line S1 of the outer peripheral surface 12*a* with respect to the stator core 11, and the lead wire 48 drawn from the drawn portion 47 can be prevented from hitting the corner of the stator core 11.

Another modification in which the thermistor element 45 is arranged between the protruding portion 37*b* and the predetermined portion 39 of the neutral wire 30 can also be adopted.

Figure 8:
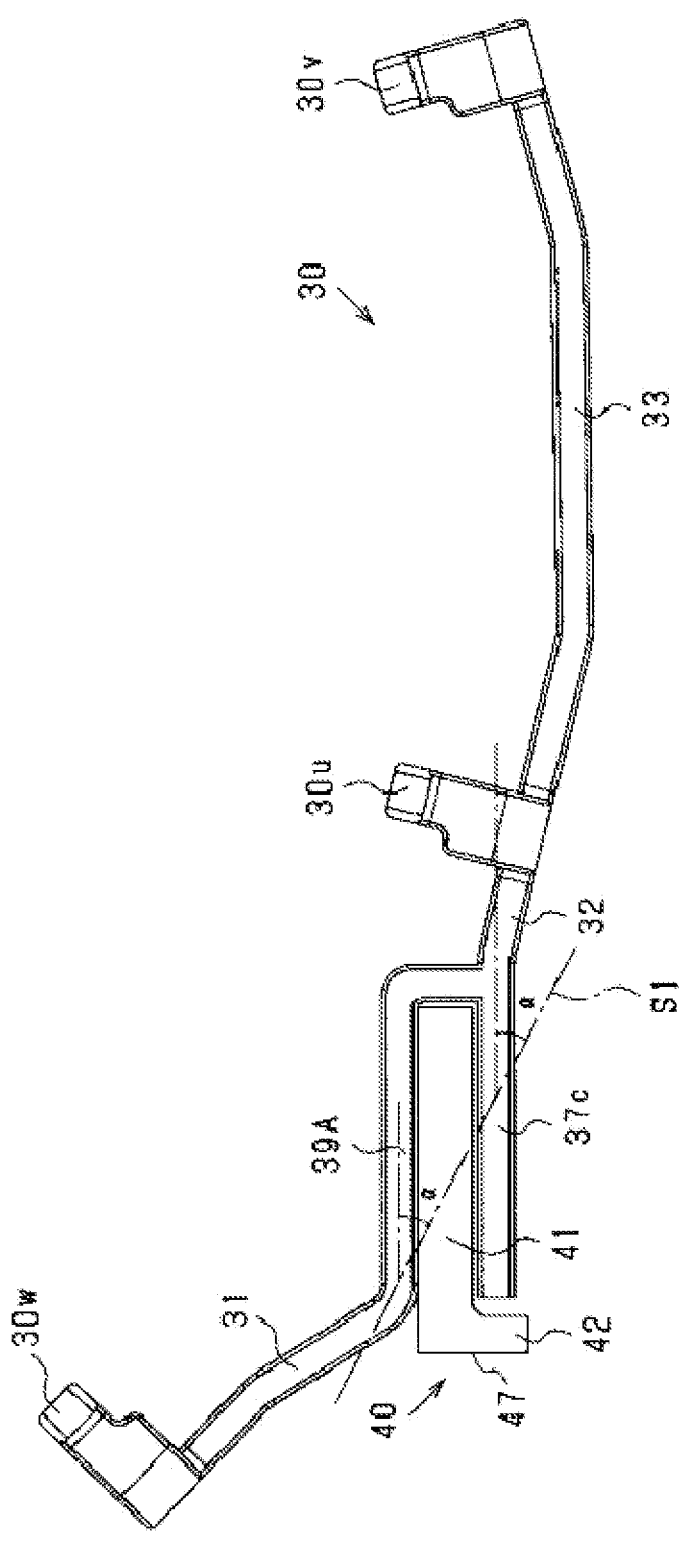
FIG. 8 is a perspective view of a modification of the neutral wire and the protruding portion.

As shown in FIG. 8, it is also possible to adopt an embodiment in which the neutral wire 30 is not provided with a U-shaped portion 35 bent into a U-shape. In this case as well, the fixing structure includes a protruding portion 37*c* which protrudes from the neutral wire 30 in a direction away from the current path (the first portion 31, the predetermined portion 39A, the second portion 32) in the neutral wire 30 during energization, and faces a predetermined portion 39 of the neutral wire 30. The temperature sensor 40 is sandwiched between the predetermined portion 39A of the neutral wire 30 and the protruding portion 37*c*. With such a configuration as well, apart from the portion of the neutral wire 30 through which the current flows, it is possible to freely form the protruding portion 37*c* facing the predetermined portion 39A of the neutral wire 30 for sandwiching the temperature sensor 40. Therefore, in the fixing structure of the neutral wire 30 and the temperature sensor 40, it becomes easy to increase the area of the portion sandwiching the temperature sensor 40. In this case, when viewed from the axial direction of the stator core 11, the angle α formed by the predetermined portion 39A and the protruding portion 37*c* (a pair of inclined portions) of the neutral wire 30 with respect to the tangent line S1 of the outer peripheral surface 12*a* of the stator core 11 is larger than the predetermined angle β. Therefore, the drawn portion 47 of the temperature sensor 40 can be directed toward the outer diameter side of the tangent line S1 of the outer peripheral surface 12*a* with respect to the stator core 11, and the lead wire 48 drawn from the drawn portion 47 can be prevented from hitting the corner of the stator core 11.

Apart from the configuration in which the temperature sensor 40 is sandwiched between the protruding portions 37*b*, 37*c* and the predetermined portions 39, 39A of the neutral wire 30, a configuration in which the temperature sensor 40 is sandwiched between the plurality of protruding portions and the predetermined portion 39, 39A of the neutral wire 30 may be adopted.

Figure 9:
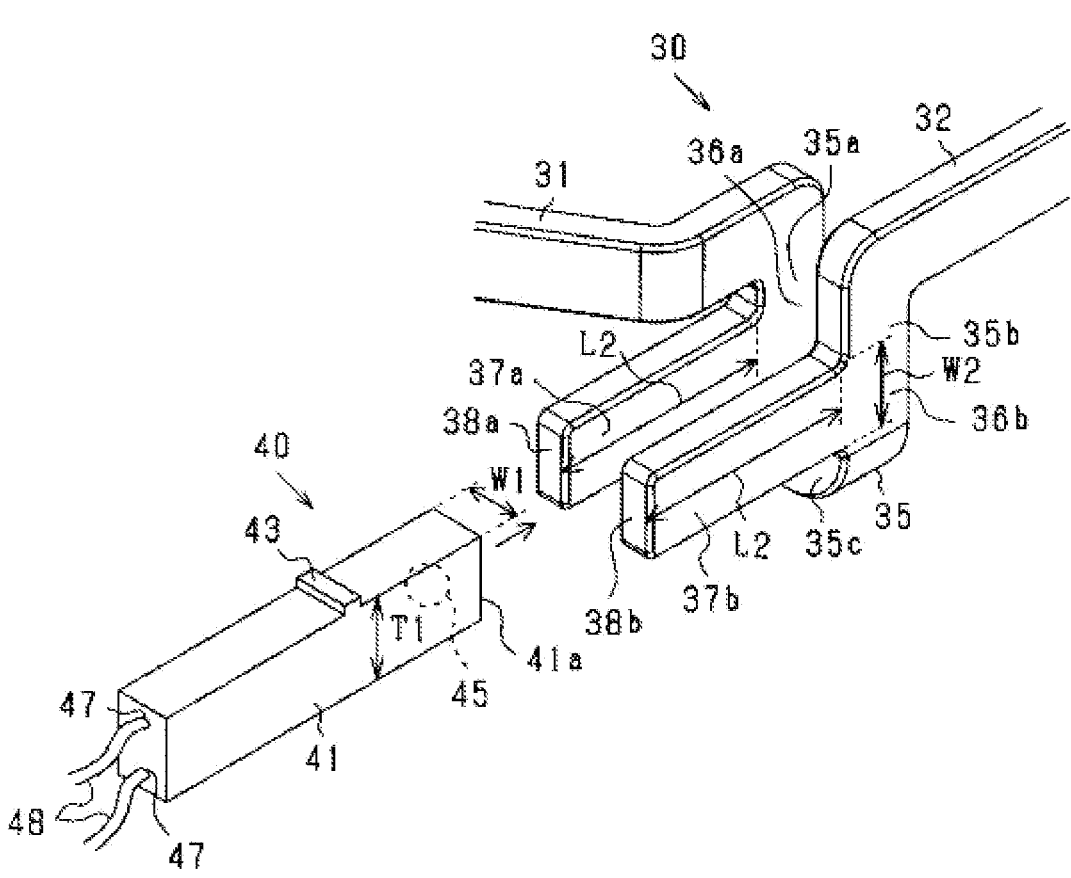
FIG. 9 is a perspective view of a modification of the temperature sensor.

As shown in FIG. 9, the temperature sensor 40 does not have to have the overhang 42. Also, the two lead wires 48 may be arranged in the height T1 direction of the main body 41.

A thermocouple may be employed as the temperature sensing element instead of the thermistor element 45.

The neutral wire 30 may be divided into a portion closer to the terminal 30*w* than the terminal 30*u* and a portion closer to the terminal 30*v* than the terminal 30*u*.

The stator coil 20 may have phase coils of four or more phases.

Characteristic configurations extracted from the above-described embodiments and modifications will be described below.

[Configuration 1]

A fixing structure for fixing a neutral wire forming a neutral point of a stator coil and a temperature sensor includes a plurality of protruding portions protruding from the neutral wire in a direction away from a current path in the neutral wire during energization and facing each other. The temperature sensor is sandwiched between the plurality of protruding portions facing each other.

[Configuration 2]

A fixing structure for fixing a neutral wire forming a neutral point of a stator coil and a temperature sensor includes a protruding portion protruding from the neutral wire in a direction away from a current path in the neutral wire during energization and facing a predetermined portion of the neutral wire. The temperature sensor is sandwiched between the predetermined portion of the neutral wire and the protruding portion.

[Configuration 3]

In the fixing structure for fixing the neutral wire and the temperature sensor according to the configuration 1 or 2, the temperature sensor includes a temperature sensing element, and the temperature sensing element is sandwiched by a portion through which current flows in the neutral wire during energization.

[Configuration 4]

In the fixing structure for fixing the neutral wire and the temperature sensor according to the configuration 3, the neutral wire includes a folded portion that is a portion through which current flows in the neutral wire during energization and is bent to fold back, and the protruding portion protrudes from the folded portion of the neutral wire, and the temperature sensing element is sandwiched between the folded portion.

[Configuration 5]

In the fixing structure for fixing the neutral wire and the temperature sensor according to the configuration 3 or 4, the protruding portion is a portion through which current is less likely to flow than the current path in the neutral wire during energization.

[Configuration 6]

In the fixing structure for fixing the neutral wire and the temperature sensor according to any one of the configurations 3 to 5, the temperature sensing element is sealed with resin.

[Configuration 7]

In the fixing structure for fixing the neutral wire and the temperature sensor according to any one of the configurations 1 to 6, the neutral wire includes a plurality of welded portions welded to the plurality of phase coils of the stator coil, respectively, and the temperature sensor is arranged between two adjacent welded portions.

[Configuration 8]

A fixing structure for fixing a neutral wire forming a neutral point of a stator coil and a temperature sensor includes the neutral wire includes a folded portion bent to fold back and a plurality of welded portions welded to the plurality of phase coils of the stator coil, the temperature sensor is sandwiched by the folded portion, and the temperature sensor is arranged between two adjacent welded portions.

[Configuration 9]

In the fixing structure for fixing the neutral wire and the temperature sensor according to the configuration 7 or 8, the temperature sensor is arranged in a center of two adjacent welded portions.

[Configuration 10]

In the fixing structure for fixing the neutral wire and the temperature sensor according to any one of the configurations 1 to 9, a stator coil is integrated with an annular stator core, the neutral wire and the temperature sensor are arranged on the outer diameter side of the stator core with respect to the stator coil and arranged in the axial direction of the stator core with respect to the stator core, the neutral wire includes a pair of inclined portions having an angle larger than a predetermined angle with respect to a tangent line of the outer peripheral surface of the stator core when viewed from the axial direction, and a non-inclined portion having an angle smaller than the predetermined angle, the temperature sensor has a drawn portion from which the lead wire is drawn, and is configured to be sandwiched between the pair of inclined portions such that the drawn portion faces an outside of the stator core in a direction along the inclined portions.

[Configuration 11]

In a fixing structure for fixing a neutral wire forming a neutral point of a stator coil and a temperature sensor, a stator coil is integrated with an annular stator core, the neutral wire and the temperature sensor are arranged on the outer diameter side of the stator core with respect to the stator coil and arranged in the axial direction of the stator core with respect to the stator core, the neutral wire includes a pair of inclined portions having an angle larger than a predetermined angle with respect to a tangent line of the outer peripheral surface of the stator core when viewed from the axial direction, and a non-inclined portion having an angle smaller than the predetermined angle, the temperature sensor has a drawn portion from which the lead wire is drawn, and is configured to be sandwiched between the pair of inclined portions such that the drawn portion faces an outside of the stator core in a direction along the inclined portions.

[Configuration 12]

In the fixing structure for fixing the neutral wire and the temperature sensor according to the configuration 10 or 11, the drawn portion is arranged on the outer diameter side of the stator core with respect to the outer peripheral surface of the stator core.

What is claimed is:

1. A fixing structure for fixing a neutral wire forming a neutral point of a stator coil and a temperature sensor, comprising:
   a plurality of protruding portions protruding from the neutral wire in a direction away from a current path in the neutral wire during energization and facing each other, wherein
   the temperature sensor is sandwiched between the plurality of protruding portions facing each other.

2. The fixing structure for fixing the neutral wire and the temperature sensor according to claim 1, wherein
   the temperature sensor includes a temperature sensitive element, and
   the temperature sensing element is sandwiched by a portion of the neutral wire through which current flows in the neutral wire during energization.

3. The fixing structure for fixing the neutral wire and the temperature sensor according to claim 2, wherein
   the neutral wire includes a folded portion which is a portion of the neutral wire through which current flows in the neutral wire during energization and which is bent to fold back,
   the protruding portions protrude from the folded portion of the neutral wire, and
   the temperature sensing element is sandwiched between the folded portions.

4. The fixing structure for fixing the neutral wire and the temperature sensor according to claim 2, wherein
   the protruding portion is a portion of the neutral wire through which current is less likely to flow than the current path in the neutral wire during energization.

5. The fixing structure for fixing the neutral wire and the temperature sensor according to claim 2, wherein
   the temperature sensing element is sealed with resin.

6. The fixing structure for fixing the neutral wire and the temperature sensor according to claim 1, wherein
   The neutral wire includes a plurality of welded portions welded to the plurality of phase coils of the stator coil, respectively, and
   the temperature sensor is arranged between two adjacent welded portions.

7. The fixing structure for fixing the neutral wire and the temperature sensor according to claim 1, wherein
   a stator coil is integrated with an annular stator core,
   the neutral wire and the temperature sensor are arranged on the outer diameter side of the stator core with respect to the stator coil and arranged in the axial direction of the stator core with respect to the stator core,
   the neutral wire includes a pair of inclined portions having an angle larger than a predetermined angle with respect to a tangent line of the outer peripheral surface of the stator core when viewed from the axial direction, and a non-inclined portion having an angle smaller than the predetermined angle,
   the temperature sensor has a drawn portion from which the lead wire is drawn, and is configured to be sandwiched between the pair of inclined portions such that the drawn portion faces an outside of the stator core in a direction along the inclined portions.

8. A fixing structure for fixing a neutral wire forming a neutral point of a stator coil and a temperature sensor, comprising:
   a protruding portion protruding from the neutral wire in a direction away from a current path in the neutral wire during energization and facing a predetermined portion of the neutral wire, wherein
   the temperature sensor is sandwiched between the predetermined portion of the neutral wire and the protruding portion,
wherein
   the neutral wire includes a plurality of welded portions welded to the plurality of phase coils of coil, respectively, and
   the temperature sensor is entirely arranged between two adjacent welded portions.

9. The fixing structure for fixing the neutral wire and the temperature sensor according to claim 8, wherein
   the temperature sensor includes a temperature sensitive element, and
   the temperature sensing element is sandwiched by a portion of the neutral wire through which current flows in the neutral wire during energization.

10. The fixing structure for fixing the neutral wire and the temperature sensor according to claim 9, wherein
   the neutral wire includes a folded portion which is a portion of the neutral wire through which current flows in the neutral wire during energization and which is bent to fold back,
   the protruding portions protrude from the folded portion of the neutral wire, and
   the temperature sensing element is sandwiched between the folded portions.

11. The fixing structure for fixing the neutral wire and the temperature sensor according to claim 9, wherein
   the protruding portion is a portion of the neutral wire through which current is less likely to flow than the current path in the neutral wire during energization.

12. The fixing structure for fixing the neutral wire and the temperature sensor according to claim 9, wherein
   the temperature sensing element is sealed with resin.

13. A fixing structure for fixing a neutral wire forming a neutral point of a stator coil and a temperature sensor comprising:
   a folded portion bent to fold back; and
   a plurality of welded portions welded to the plurality of phase coils of the stator coil, wherein
   the folded portion and the plurality of welded portions are provided on the neutral wire,
   the temperature sensor is sandwiched by the folded portion, and the temperature sensor is arranged between two adjacent welded portions,
wherein
the neutral wire includes a first portion and a second portion,
the folded portion is provided between the first portion and the second portion, and
the folded portion has leg parts formed to extend axially with respect to an axial direction of a stator core around which the stator coil is wound and in the same direction perpendicular to a center line of the first portion and the second portion, and a bottom part is provided to connect the leg parts.

14. The fixing structure for fixing the neutral wire and the temperature sensor according to claim 13, wherein
   the temperature sensor is arranged in a center between the two adjacent welded portions.

15. The fixing structure for fixing the neutral wire and the temperature sensor according to claim 13, wherein
   a protruding portion is provided from the folded portion in a direction away from the current path in the neutral wire when current is applied, and faces a predetermined portion of the neutral wire, and
   the temperature sensor is sandwiched between the folded portion, the predetermined portion of the neutral wire, and the protruding portion.

16. A fixing structure for fixing a neutral wire forming a neutral point of a stator coil integrated with an annular stator core and a temperature sensor, both of which are configured to be arranged on the outer diameter side of the stator core with respect to the stator coil and arranged in the axial direction of the stator core with respect to the stator core, comprising:
   a pair of inclined portions having an angle larger than a predetermined angle with respect to a tangent line of the outer peripheral surface of the stator core when viewed from the axial direction, and a non-inclined portion having an angle smaller than the predetermined angle, both of which are provided in the neutral wire; and
   a drawn portion from which the lead wire is drawn, which is provided in the temperature sensor, wherein
   the temperature sensor is sandwiched between the pair of inclined portions such that the drawn portion faces an outside of the stator core in a direction along the inclined portions.

17. The fixing structure for fixing the neutral wire and the temperature sensor according to claim 16, wherein
   the drawn portion is arranged on the outer diameter side of the stator core with respect to the outer peripheral surface of the stator core.

* * * * *